United States Patent Office 2,826,920
Patented Mar. 18, 1958

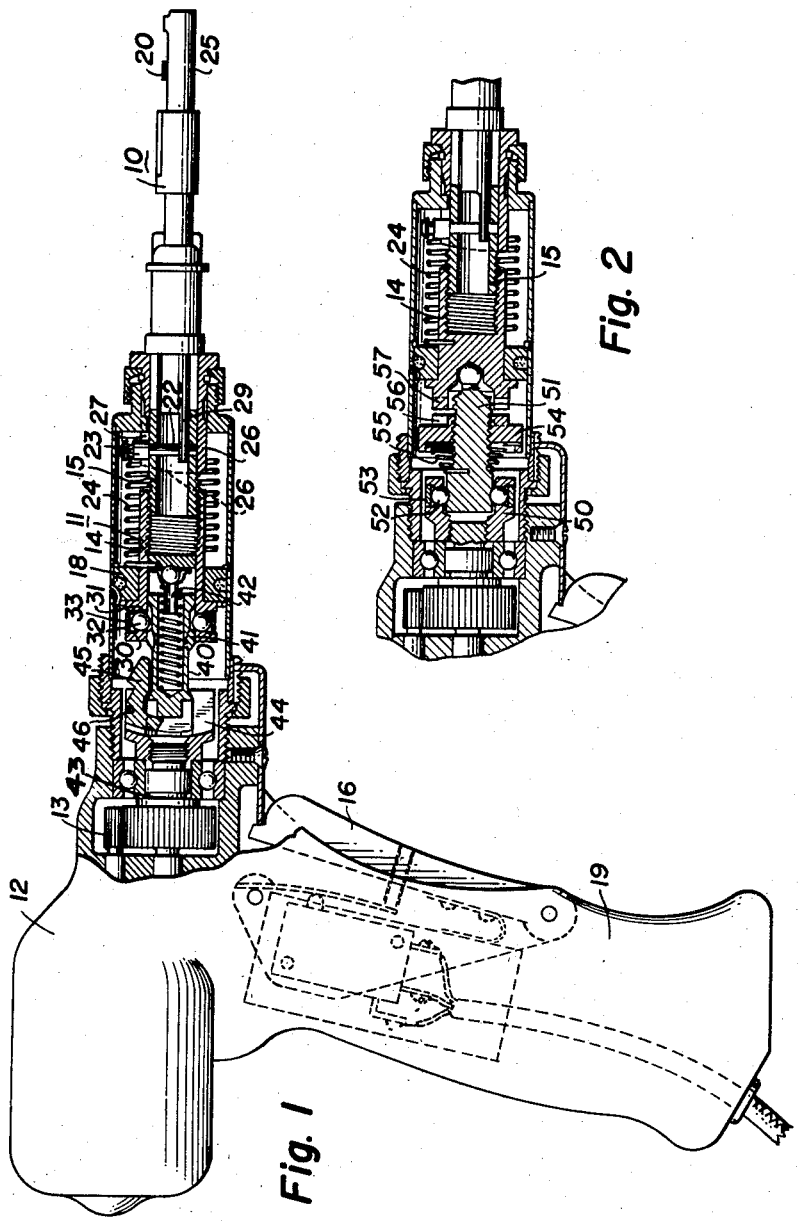

2,826,920

RETRACTION AND ROTATION TRANSMISSION FOR HAND TOOLS

William A. Barnes, Utica, and Walter J. Rozmus, Whitesboro, N. Y., assignors to Utica Drop Forge & Tool Corporation, a corporation of New York Application August 29, 1955, Serial No. 531,221

8 Claims. (Cl. 74—22)

This invention relates in general to driving transmissions for tool devices, and relates more specifically to a transmission to drive the bit of a wire wrapping tool used to effect solderless connections, wherein the bit parts must first be moved relative to one another and thereafter rotate as a unit.

The construction of tools for effecting solderless connections between a wire and a terminal is illustrated by such patents as No. 2,646,121 issued to Frank Reck, August 18, 1953, and by the patent application in the name of William A. Barnes, Serial No. 492,246, filed March 4, 1955.

The Reck patent illustrates a non-reciprocating type of bit, but the Barnes application teaches an improved type of bit wherein a relative longitudinal movement takes place between the bit parts to shear the end of a wire and to aid in the easy loading of the wire into the bit. The provision of the longitudinally shiftable parts introduces a need for means to shift such parts. The provision of a mechanical drive to shift the parts met with objection because the operators are required to shift the bit hundreds of times during each working hour and accordingly even though the shifting power requirement is quite low, it nevertheless becomes tiresome after even a short period of use. Accordingly, this invention provides for power shifting of tool parts prior to rotation of the tool.

Therefore, an object of this invention is to provide a transmission device which first retracts to provide a non-rotating pulling force, and thereafter rotates the driven device.

When a tool such as a wire wrapping bit is used over long periods of time in production work, it is a great handicap to be required to hand position the bit for insertion of a lead wire, or other workpiece.

Therefore, another object of this invention is to provide a transmission device which returns the driven device to a predetermined home position.

Also, hand tools that are used in production work are held most of each working day. Such tools are therefore better adapted if they are as light in weight as possible. It is well known that a motor power source, especially an electric motor, delivers more horsepower after it has reached operating speed than during starting. A very light-weight electric motor can deliver ample power for a wire wrapping tool after it has reached operating speed, but would be considerably heavier if a large starting torque were provided.

Accordingly, still another object of this invention is to provide a clutch device which will operate by reaction forces to detachably connect the transmission to a motor after the motor has reached full operating speed.

Other objects and a fuller understanding of the invention may be had by referring to the following specification and claims, taken in conjunction with the accompanying drawing, in which:

Figure 1 is a side view, partially in section, of a complete wire wrapping solderless connector tool having the improved transmission of this invention therein; and, Figure 2 is a similar view, in the transmission area only, of a modified form of clutch arrangement.

The prior art device as shown by the Reck patent provides a motor driven construction with various features claimed by the inventor in that patent, but insofar as the bit portion is concerned there is provided a fixed spindle having at its front end portion an opening such as a drilled hole longitudinally thereof for receiving the terminal of an electrical device such, for example, as that of a relay. At its periphery there is a socket recess extending longitudinally for receiving the end of the wire to be wound or wrapped around the terminal. Thus, the Reck device teaches the use of a rotary shaft having a central opening and a laterally spaced opening which requires hand feeding of the wire and the terminal into tht bit before the bit shaft begins the rotational winding operation.

In the drawing illustrating this invention, the bit portion is indicated generally by the reference character 10. Bit 10 is substantially identical to the bit more fully set forth and explained in the indicated Barnes application Serial No. 492,246. This bit provides a bed member 20 which is stationary. Bed member 20 is carried internally of a longitudinally reciprocable slide 25. Therefore only a slight tip end portion of the bed 20 may be seen in the side view as set forth in Figure 1. Bed member 20 is in essence a fixed rod operating internally of the reciprocable slide 25. In this illustrated bit construction, the slide 25 is more massive than the bed 20. The parts are named for their respective sliding and stationary characteristics, rather than their appearance. A spring is contained within the bit 10 and urges the slide 25 to the extended position beyond the end of the bed 20 as illustrated in the Figure 1 where the relaxed position is set forth. A hook end 29 on the slide 25 is engaged by suitable retracting mechanism, which is the subject matter of the present invention.

The present invention is a transmission indicated quite generally by the reference character 11, and provides the function of both a retracting and rotating drive device. The transmission 11 operates from power supplied by a suitable air or electric motor contained within a motor housing 12 and acting through a gear train 13. Some types of motor devices may not require the gear train 13. The tool is in the familiar gun-type configuration generally adapted for hand tools and is provided with a handle grip 19. A trigger 16 is employed on the grip to operate a micro switch or other control mechanism located within the handle.

The basic function and feature of the transmission 11 is embodied in a female sleeve shaft 14 and a male sleeve shaft 15 which respectively constitute a first and second member in axial alignment. These members are threadably interconnected as indicated in the drawing. The first member or female sleeve shaft 14 is preferably rotatably and non-reciprocably mounted by means of a bearing device 18. The second or male sleeve shaft 15 may reciprocate longitudinally and rotate. Thus, if the female sleeve shaft 14 is rotated rapidly, the inertia of the member 15 would cause a relative threading movement which is likened to a cam and cam follower action, and member 15 will be retracted and gradually brought up to full rotational speed equal to the speed of the member 14. However, it is desired to first retract the slide 25 without any rotation and thereafter cause full unitary rotation of the bed 20 and the slide 25.

In order to accomplish such shifting and later rotation, a pin 22 is placed diametrically through and across the member 15. Pin 22 serves as an anchor to which the hook end of slide 25 may be attached. Furthermore, a cam follower head 23 is provided as an exterior extension of the pin 22. A cam homing track 26 is carried at the forward end of the housing surrounding the transmission 11. The homing track as set forth in the illustrated embodiment of the invention comprises a tubular shaped member having a notch 27 at the top into which the cam follower head 23 of pin 22 may sit and be held against rotational revolvement. The face of the homing track 26 slopes away from the bumper track portion, which is defined by the notch 27, to a high point diametrically opposite from the bumper track portion notch 27.

Although as thus far described the members 14 and 15 will first retract and then rotate a bit, a closely associated function is produced by a coil spring 24, and therefore is explained along with the means to retract and rotate. The spring 24 encompasses both the male and female sleeve shafts 15 and 14. Spring 24 is attached at one end to member 14 and at the other end to the member 15 or to the pin 22 as desired. Therefore the spring 24 serves as a resilient means to urge the members 14 and 15 to an extended threaded position. Any relative rotation of the members will result in a tensioning of the spring 24 which will resist the relative rotation and tend to return the members to their original positions as illustrated in Figure 1. The resilient spring means therefore causes extension of the members.

The function of the transmission may now be partially understood. The members 14 and 15 are designed to cooperate under certain circumstances to transmit a driving force from a driving source to a driven member. Under other conditions the transmission will produce a pulling force without rotation. The pulling force is accomplished first when the driving power is applied to member 14. As illustrated in Figure 1, the tool is in its relaxed or rest position. The head 23 of pin 22 is in contact with the bumper track portion defined by notch 27. Accordingly, pin 22 will hold the member 15 against rotation. Therefore, rotational driving force applied to the member 14 will cause the members 14 and 15 to rotate relative to one another and such rotational movement will cause a retraction of the member 15 with respect to the member 14 because of their threaded interconnection. Retraction of the member 15 pulls the pin 22 and consequently will cause the head 23 to move out of the notch 27. During the retraction movement it should be noted that the spring 24 will be wound tightly around the periphery of the members 14 and 15. After the head 23 clears the notch 27, there is then no longer a restraint against rotational movement of the member 15, or if such resistance is insufficient, as soon as the spring 24 is wound to its limit, the threaded movement will be stopped and rotational movement imparted. Furthermore, the extent of the threads between the members 14 and 15 will bring the retraction movement to an end and cause rotational movement. Any one or all three of these factors operating together will cause a driving transmission to rotate members 14 and 15 as a unit after head 23 has cleared the notch 27.

Accordingly, the first object of the invention is accomplished wherein a retraction drive is first provided to place a pull on the driven member, whereupon after having been fully retracted to a predetermined degree, a rotational drive is imparted. In the illustrated embodiment of this invention the retraction drive is employed to pull the hook 29 and move the slide 25 back to a predetermined working position with respect to the bed member 20.

Upon release of the driving power from the driving source, the spring 24 will tend to rotate the members 14 and 15 in opposite directions to bring the parts back to their extended rest position. Such relative movement will cause the member 15 to extend with respect to the member 14 inasmuch as member 14 is longitudinally fixed. Such longitudinal extension will soon cause the head 23 of pin 22 to contact the sloping face of the homing track 26, and because of the cam action of the sloping face, the head 23 will be led into the notch 27. Upon reaching the entrance to the notch 27, the pin 22 will cease to rotate because further rotation would require the pin to retract toward the member 14 in order to clear the high point of the homing track 26. Of course such retraction movement is impossible without reversing of the relative rotational movement of members 14 and 15. Therefore member 15 comes to a stop under the drive of spring 24 when the homing track leads the head 23 of the pin 22 into the mouth of notch 27. At such stage the slide 25 is not yet fully extended and the spring 24 is not fully relaxed. It will be recalled that a spring within the bit 10 places a steady pull on the hook 29 tending to drag the pin 22 forward, but such forward movement is not possible without relative movement between the members 14 and 15.

The next reaction will be for the member 14 to rotate when the member 15 becomes locked due to engagement of head 23 into notch 27. Generally the spring 24 cannot be made sufficiently heavy to drive the motor in a reverse direction, particularly when interconnected to a gear train 13. Therefore, a releasable clutch mechanism is employed which completely releases member 14 upon cessation of driving power. Therefore, while the rotation of member 15 takes place as described, the member 14 will also be rotating in a direction counter to its normal driving direction. Therefore both members 14 and 15 reverse and cause the extension desired to move the pin 22 forward. Whenever the head 23 of pin 22 enters the notch 27 and therefore stops the rotational movement of member 15, nevertheless the rotation of member 14 may and will continue until the driving force stored within the spring 24 is exhausted. Such continual rotation of member 14 therefore permits the member 15 to advance forward and seat the head 23 of pin 22 deep within the notch 27. Such forward movement will take place until the rest position shown in Figure 1 has been reached.

In Figure 1 a very desirable type of drive construction is set forth. The member 14 is provided with an anvil end 30 on the opposite side of the bearing 18 from the spring 24. Anvil end 30 is a means for holding two ball devices which serve a portion of the function of an intermittent rap hammer drive device. In the embodiment illustrated in Figure 1 two diametrically opposed ball seat sockets 31 are provided on the anvil 30 and balls 32 are placed therein. The member 14, being of sleeve form, has a longitudinal opening therethrough. The sockets 31 open into the interior. A spring clip 33 is clipped over the balls and causes the balls to be urged through the ball seat sockets 31 and project into the interior of member 14 as shown in Figure 1.

An anvil shaft 40 is dimensioned to fit closely within the interior of the member 14. A plurality of abutment shoulders 41 are placed in a common plane about the periphery of the shaft 40. Forward of the abutment shoulders 41 the surface of the shaft 40 is reduced in size in order to completely clear the balls 32 and prevent any drive transmission. A spring and thrust bearing device 42 urges the shaft 40 to position the common plane of the abutment shoulders 41 out of the plane of the balls 32.

A shaft 43 is rotationally driven as illustrated from the gear train 13. A shell 44 is carried by shaft 43. Shell 44 has an irregular interior form, preferably similar to a socket wrench. The head of shaft 40 is formed for a slidable fit therein, and can therefore move longitudinally while transmitting a driving torque. Fly weight dogs 45 are then pinned to the shell 44 by means of fulcrum pins 46. As may be seen in Figure 1 the dogs 45 act under the influence of centrifugal force from rotational speed to produce a pivotal driving force. The pins 46 serve as pivot means for dogs 45. Accordingly, upon commencing of drive through the gear train 13, the driving source is permitted to come substantially to full speed, and therefore to maximum driving efficiency, before any driving connection is made between the anvil shaft 40 and the anvil end 30 of member 14. When sufficient speed is produced, dogs 45 will shift the anvil shaft 40 forward. A safety factor is then encountered. The rotational drive speed is gradually built up through a rap hammer effect produced between the shoulders 41 and the balls 32. Also, in the event of an overloaded bit condition, neither the motor nor the bit will be damaged, because the ball drive provides an overload release effect.

In Figure 2 of the drawing, a modified embodiment of the drive interconnection is illustrated which employs an improved form of inertia mechanism for effecting the complete disengagement of the member 14 upon cessation of driving power. In this embodiment a shell 50 is interconnected to an intermediate shaft 51 by means of an impact drive effect produced by balls 53 urged into their holding pockets by a spring clip 53. The forward end of the intermediate shaft 51 is threaded and an inertia fly weight member 54 is threadably engaged upon the end of the shaft. A coiled spring 55 interconnected at one end with shaft 51 and at the other end with the weight device 54, urges the weight device 54 to a retracted position on the shaft 51 as illustrated in Figure 2. The weight 54 carries on the forward face thereof a plurality of projecting segmental teeth 56 and similar teeth 57 are carried on the anvil end of the member 14.

The operation of the embodiment illustrated in Figure 2 is in many respects an improved and better version than that set forth in Figure 1. In this modification the intermediate shaft 51 is quickly brought to rotational speed by the rap hammer action of the balls 52 acting upon cooperating abutment shoulder areas on the surface of the shaft. As the shaft 51 comes up to rotational speed, the mass of the member 54 will resist rotation and therefore cause a relative threading of the member 54 upon the shaft 51. The weight device 54 will thus move forward against the urge of the spring 55. Such forward movement will engage the teeth 56 and 57. Upon such engagement further forward rotational movement is not possible, and therefore a solid rotational driving interconnection is produced between the driving source and the member 14.

Upon cessation of the driving power the coil spring 55 may exert its influence and cause the member 54 to rotate in the opposite direction and thread to the retracted position and thus disengage the teeth 56 and 57. The member 14 is then free to rotate at will under the influence of the spring 24.

In the embodiment set forth in Figure 2, therefore, the clutch device produced by the balls 52 on the surface of shaft 51 act as an overload safety factor and a means for bringing the transmission up to driving speed. Upon engagement of the teeth 56 and 57, should there be any unusual load, or if an extra heavy wire is inserted into the cutting surfaces of the bit 10, this impact hammer clutch structure will allow relative movement of the motor without damage to any of the mechanism of the transmission and will continue to impart driving force and small impact increments which will gradually carry the working mechanism through the load, or if the load is too large will simply permit continued rotation of the motor without damage.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and the scope of the invention as hereinafter claimed.

What is claimed is:

1. A retracting and rotating drive device, comprising, a first and a second rotatable member threadably interengaged in axial alignment, said first and second members thereby being relatively extendable and retractable between an extended position and a retracted position by relative rotation, extending means urging said first and second members to rotate relatively to said extended position, a rotatable power source, releasable clutch means connecting said power source to said first member, and means to hold said second member against rotation when the first and second members are extended a predetermined amount, whereby application of driving power to said first member will cause said first and second members to retract relatively and thereafter rotate as a unit, and said extending means will cause opposed rotation and extension upon release of the driving power.

2. A retracting and rotating drive device, comprising, a first and a second rotatable member threadably interengaged in axial alignment, said first and second members thereby being relatively extendable and retractable between an extended position and a retracted position by relative rotation, extending means urging said first and second members to rotate relatively to said extended position, a rotatable power source to drive said first member, and means to hold said second member against rotation when the first and second members are relatively extended a predetermined amount, whereby application of driving power to said first member will cause said first and second members to retract and thereafter rotate as a unit, and said extending means will cause opposed rotation and extension upon release of the driving power.

3. A retracting and rotating drive device, comprising, a first and a second rotatable member threadably interengaged in axial alignment, said first and second members thereby being relatively extendable and retractable between an extended position and a retracted position by relative rotation, extending means urging said first and second members to rotate relatively to said extended position, a rotatable power source, releasable clutch means acting in response to driving rotation of the power source to drivingly engage said power source to said first member, said clutch means releasing said driving engagement upon cessation of the driving rotation, and means to hold said second member against rotation when the first and second members are relatively extended a predetermined amount, whereby application of driving power to said first member will cause said first and second members to retract and thereafter rotate as a unit, and said extending means will cause opposed rotation and extension upon release of the driving power.

4. A retracting and rotating drive device, comprising, a first and a second rotatable member threadably interengaged in axial alignment, said first and second members thereby being relatively extendable and retractable between an extended position and a retracted position by relative rotation, extending means urging said first and second members to rotate relatively to said extended position, a rotatable power source, inertia operated engagement means acting in response to driving rotation of the power source to drivingly engage said power source to said first member, said inertia operated engagement means including a threaded shaft rotatably driven by said power source, an inertia member threadably engaged on said shaft, resilient means between said shaft and inertia member urging said inertia member to a retracted position back on said shaft, the direction of rotation of said shaft and the hand of the mutual threaded engagement producing a tendency to thread the inertia member off the shaft as the inertia member resists rotation at the start of the driving power, cooperating clutch face means carried by the first member and the inertia member positioned to engage as the inertia member moves forward on the shaft, said resilient means threading the inertia member back to separate the clutch face means upon cessation of driving power, and means to hold said second member against rotation when the first and second members are relatively extended a predetermined amount, whereby application of driving power to said first member will cause said first and second members to retract and thereafter rotate as a unit, and said extending means will cause opposed rotation and extension upon release of the driving power.

5. A retracting and rotating drive device, comprising, a first and a second member in axial alignment and threadably interconnected, said first member rotatable and non-reciprocably mounted, a coil spring surrounding both members, said coil spring connected at one end to said first member and connected at the other end to said second member, said coil spring urging said first and second members to an extended relative position, a stationary guide surface, interlocking surface means between said second member and said stationary guide surface, said interlocking guide surfaces positioned to engage only through a portion of the possible retraction of the second member, and detachable drive means to rotatably drive said first member, whereby rotation of the first member causes a retraction of the second member until the second member clears the guide surface whereupon both first and second members rotate together, and upon release of the drive from the first member both members rotate in opposing directions under the urge of the coil spring until the second member engages the guide surface and ceases to rotate, the first member thereafter rotating alone and pushing the second member further forward.

6. Operating and power drive means for a wire wrapping bit having parts which are first longitudinally shifted and thereafter jointly rotated, said operating and power drive means comprising, a first and a second power transmission member, said first member being rotatable and non-reciprocable, said first and second members having mutually interengaged cam screw surface means, said second member thereby adapted to maintain a given longitudinal position with respect to said first member by rotating therewith and adapted to move longitudinally by maintaining a differential speed, means to lock said second member against rotation in a selected portion of its possible longitudinal path of movement, a rotatable power source, and a clutch engagement means between the power source and the first member.

7. A retraction and rotation drive device, comprising, a first and a second rotatable member threadably engaged in axial alignment, said first and second members thereby being relatively extendable and retractable between an extended position and a retracted position by relative rotation, a rotatable power source, releasable clutch means drivingly engaging said power source to said first member, bearing means holding said first member axially fixed and rotatable, resilient means interconnected to said first and second members, said resilient means urging said first and second members to said extended position by tensioning as the members relatively rotate to retract, a cam guide homing track encompassing said second member, said homing track having a longitudinally extending bumper track portion extending in the axial direction of said first and second members and the remainder thereof sloping toward said bumper track portion, a cam follower carried by said second member to ride said bumper track portion and hold said second member against rotation thereby inducing longitudinal retraction of the second member upon rotation of the first member until said cam follower clears the cam guide homing track whereupon the second member is free to rotate, said cam follower inducing homing rotation of the second member upon extension of the second member by said cam follower's contacting the sloping cam surface and thereby causing the cam follower to return to the bumper track portion and remain in contact therewith, said first and second members being oppositely rotatable under the urge of said resilient means upon release of the clutch means to thereby extend the second member against and into the bumper area of the cam means, whereby an operating tool may be successively retracted, rotated, and returned to a home position.

8. A retraction and rotation drive device, comprising, a first and a second rotatable member threadably engaged in axial alignment, said first and second members thereby being relatively extendable and retractable between an extended position and a retracted position by relative rotation, a rotatable power source, a longitudinally shiftable and rotatable shaft, means non-rotatably interconnecting said shaft to said power source, abutment surface means located in a plane at an intermediate position on said shaft, a ball race carried by said first member, said ball race having a shaft receiving opening therein, said shaft extending into said opening, ball means carried by said race, said ball means revolvable in a plane, resilient means urging said ball means against said shaft, means responsive to the speed of rotation of said power source to shift said shaft forward to a position wherein the abutment surface means is located in the plane of rotation of the ball means, resilient means urging said shaft in a direction opposite said speed responsive means with a force less than the force of said speed responsive means, bearing means holding said first member axially fixed and rotatable, resilient means interconnected to said first and second members, said resilient means urging said first and second members to said extended position by tensioning as the members relatively rotate to retract, a cam guide homing track encompassing said second member, said homing track having a longitudinally extending bumper track portion extending in the axial direction of said first and second members and the remainder thereof sloping toward said bumper track portion, a cam follower carried by said second member to ride said bumper track portion and hold said second member against rotation thereby inducing longitudinal retraction of the second member upon rotation of the first member until said cam follower clears the cam guide homing track whereupon the second member is free to rotate, said cam follower inducing homing rotation of the second member upon extension of the second member by said cam follower's contacting the sloping cam surface and thereby causing the cam follower to return to the bumper track portion and remain in contact therewith, said first and second members being oppositely rotatable under the urge of said resilient means upon release of the clutch means to thereby extend the second member against and into the bumper area of the cam means, whereby an operating tool may be successively retracted, rotated, and returned to a home position.

No references cited.